United States Patent Office 3,496,215
Patented Feb. 17, 1970

3,496,215
HYDROCYANATION OF OLEFINS USING SE-
LECTED NICKEL PHOSPHITE CATALYSTS
William C. Drinkard, Wilmington, and Richard V. Lindsey, Jr., Hockessin, Del., assignors to E. I. du Pont de Nemours and Company, Wilmington, Del., a corporation of Delaware
No Drawing. Filed Nov. 23, 1965, Ser. No. 509,432
Int. Cl. C07c 121/50, 121/20, 121/04
U.S. Cl. 260—465.8      12 Claims

ABSTRACT OF THE DISCLOSURE

Process for hydrocyanating olefinically unsaturated organic compounds at from −25 to 200° C. using as catalyst a compound of the structure Ni(PXYZ)$_4$ where X is OR and Y and Z are or OR and R is an alkyl or aryl radical of up to 18 carbon atoms.

---

This invention relates to the hydrocyanation of selected unsaturated compounds with certain zero valent nickel catalysts.

It is known that the addition of hydrogen cyanide to double bonds adjacent an activating group such as a nitrile or acyloxy group, proceeds with relative ease. However, the addition of hydrogen cyanide to non-activated double bonds proceeds only with difficulty, if at all, and normally requires the use of high pressures of about 1,000 p.s.i. or more and high temperatures in the range of 200 to 400° C. United States Patent 2,751,099, issued Oct. 16, 1951 to Paul Arthur, Jr., and Burt Carlton Pratt, discloses a technique which involves the use of nickel carbonyl with or without the addition of a tertiary aryl phosphine or arsine. This process suffers from producing a relatively high percentage of undesirable polymeric products when applied to monoolefinic starting materials and a relatively poor yield in all cases. Furthermore, this process is not satisfactory for the production of adiponitrile from 3 or 4-pentenenitrile.

The present invention provides a process which produces nitriles or dinitriles from olefins in high yield, under mild conditions, with minimal formation of polymer.

The process of the present invention is generally applicable to unsaturated compounds. The open chain conjugated polyolefins such as butadiene are especially preferred along with the pentenenitriles such as 3-pentenenitrile, 4-pentenenitrile and 2-methyl-3-butenenitrile. Suitable unsaturated compounds include olefins and olefins substituted with groups which do not attack the catalyst such as cyano and chloro. These unsaturated compounds include monoolefins containing from 2 to 20 carbon atoms such as ethylene, propylene, butene-1, pentene-2, hexene-2, etc., diolefins such as butadiene, isoprene, allene, butadiene-1,2 and substituted compounds such as styrene, α-methyl styrene, 3-pentenenitrile, 4-pentenenitrile, and 2-chlorobutadiene. The process also finds special advantage in the production of 2 - methylglutaronitrile from 2-methyl-3-butenenitrile.

The catalysts have the general formula Ni(PXYZ)$_4$, wherein X is OR and Y and Z are selected from the class consisting of OR and R, wherein R is selected from the class consisting of alkyl and aryl groups having up to 18 carbon atoms. If desired, any of X, Y and Z may be cojoined. The catalyst preferably is prepared prior to use. However, the catalyst can be prepared in situ by adding a divalent nickel compound such as nickel halides, nickel acetylacetonate, nickel acetate, a compound of the formula PXYZ where XY and Z have the meaning defined above and a base such as diethylamine. While the amount of catalyst present is not critical, it is generally preferable that excess unsaturated compound be present.

The hydrocyanation reaction can be carried out with or without a solvent. The solvent should be a liquid at the reaction temperature and inert towards the unsaturated compound and the catalyst. Generally, such solvents are hydrocarbons such as benzene, xylene, or nitriles such as acetonitrile, benzonitrile, or adiponitrile.

The exact temperature used is dependent, to a certain extent, on the particular catalyst being used, the particular unsaturated compound being used and the desired rate. Generally, temperatures of from −25° C. to 200° C. can be used with from 0° to 150° C. being the preferred range.

The reaction may be carried out by charging a reactor with all of the reactants or preferably the reactor is charged with the catalyst or catalyst components, the unsaturated compound and whatever solvent is to be used and the hydrogen cyanide gas is swept over the surface of the reaction mixture or bubbled through said reaction mixture. If desired, when using a gaseous unsaturated organic compound, the hydrogen cyanide and the unsaturated organic compound may be fed together into the reaction medium. The molar ratio of unsaturated compound to catalyst generally is varied from about 10:1 to 2000:1 unsaturated compound to catalyst for a batch operation. In a continuous operation such as when using a fixed bed catalyst type of operation, a much higher proportion of catalyst may be used such as 1:2 unsaturated compound to catalyst.

Preferably, the reaction mixture is agitated, such as by stirring or shaking.

The cyanated product can be recovered by conventional techniques such as crystallization of the product from solution or by distillation.

EXAMPLE I

A mixture of 20 g. of Ni[P(OEt)$_3$]$_4$ 50 ml. benzene, 108 g. of liquid butadiene, and 54 ml. of liquid HCN is charged to a cooled, 400 ml., stainless steel pressure tube. The tube is heated at 100° C. for 8 hours, then cooled and vented. The dark red, crude liquid is distilled at 0.1 mm. at a pot temperature up to 100° C. to obtain a mixture of products composed of: 0.65 g. of trans-2-methyl-2-butenenitrile, 46.0 g. of 2-methyl - 3 - butenenitrile, 3.1 g. of cis-2-methyl-2-butenenitrile, 58.3 g. of trans-3-pentenenitrile, and 0.61 g. of cis-3-pentenenitrile. These products represent 49 cycles (moles of product/ moles of catalyst) of the catalyst to produce nitrile products. Products are separated by gas chromatography and identified by gas chromatographic retention time, mass spectrometry, infrared spectrometry, nuclear magnetic resonance spectroscopy.

Table I reports the results obtained for the hydrocyanation of butadiene using a representative group of tetrakis (organophosphite)nickel(O) catalysts using the conditions described in Example I. In each case, a temperature of 100° C. for 8 hours is used. In Table I, Et stands for ethyl, Bu for butyl, iPr for isopropyl, φ for phenyl, and Me for methyl.

TABLE I

| Products | CATALYST | | | | |
|---|---|---|---|---|---|
| | Ni[P(OEt)$_3$]$_4$ | Ni[P(OBu)$_3$]$_4$ | Ni[P(O-iPr)$_3$]$_4$ | Ni[P(O$\phi$)$_3$]$_4$ | Ni[P(OMe)$_3$]$_4$ |
| Cis-3-pentenenitrile, g | .77 | .55 | | | .46 |
| 4-pentenenitrile, g | .34 | | | | .06 |
| Trans-3-pentenenitrile, g | 30.1 | 3.9 | 1.4 | .8 | 28.8 |
| Cis-2-methyl-2-butenenitrile, g | .34 | 1.6 | | | .27 |
| 2-methyl-3-butenenitrile, g | 22.3 | 29.8 | 1.4 | .56 | 24.5 |
| Trans-2-methyl-2-butenenitrile, g | .26 | .39 | .14 | | .10 |
| Reagents: | | | | | |
| HCN, ml | 27 | 27 | 27 | 27 | 27 |
| Butadiene, g | 54 | 54 | 54 | 54 | 54 |
| Catalyst, g | 20 | 28 | 23 | 35 | 16 |

Although the reaction is conveniently run at 100° C. other temperatures may also be used. Table II illustrates the effect of temperature using 0.027 mole of Ni[POEt)$_3$]$_4$ as catalyst, 1 mole of butadiene, and 1 mole of HCN. In each run the time spent was 8 hours.

TABLE II

| Products | Temperature | | |
|---|---|---|---|
| | 50° C. | 75° C. | 100° C. |
| Cis-3-pentenenitrile, g | .06 | .22 | .40 |
| 4-pentenenitrile, g | | | .10 |
| Trans-3-pentenenitrile, g | 10.5 | 22.4 | 24.8 |
| Cis-2-methyl-2-butenenitrile, g | .42 | .06 | 1.7 |
| 2-methyl-3-butenenitrile, g | 8.1 | 20.0 | 18.0 |
| Trans-2-methyl-2-butenenitrile, g | .01 | .02 | .45 |

The hydrocyanation of butadiene may be carried out over a wide range of HCN:butadiene ratios. However, excess butadiene is desirable for best catalyst efficiency. Flash reactions have been noted when excess butadiene is present. When this occurs, high conversions to nitrile products are obtained in less than 6 minutes. The occurrence of a flash reaction is indicated by a rapid rise in temperature of 10–55° C. or more. Table III illustrates the effect of HCN:butadiene ratio on yield when Ni[P(OEt)$_3$]$_4$ is used as catalyst.

EXAMPLE II

A mixture of 20 g. of Ni[P(OEt)$_3$]$_4$, 50 ml. of benzene, 27 ml. of HCN and 40 g. of allene is charged to a 400 ml., stainless steel pressure tube under nitrogen. The reaction mixture is heated at 100° C. for 8 hours, cooled, and vented. The dark red, crude liquid is distilled at 0.1 mm. at a pot temperature up to 100° C. to obtain a mixture of products composed of 29.7 g. of trans-2-butenenitrile and 13 g. of cis-2-butenenitrile. Products are separated by gas chromatography and identified by infrared spectroscopy.

EXAMPLE III

A mixture of 20 g. of Ni[P(OEt)$_3$]$_4$, 68 g. of isoprene and 27 ml. of liquid HCN is charged to a 400 ml., stainless steel pressure tube, heated at 100° C. for 8 hours, cooled, and vented. Product is recovered as a deep red liquid. Gas chromatography shows that the liquid contains 21% of

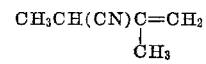

and 26% of

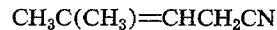

TABLE III

| | Run 1 | Run 2 | Run 3 | Run 4 | Run 5 | Run 6 |
|---|---|---|---|---|---|---|
| Conditions:[1] | | | | | | |
| HCN, ml | [2]27 | 27 | [2]27 | 27 | 54 | 81 |
| Butadiene, g | 108 | 108 | 54 | 54 | 54 | 54 |
| Products: | | | | | | |
| Cis-3-pentenenitrile, g | .41 | .38 | .77 | .40 | .20 | .17 |
| 4-pentenenitrile, g | | | .34 | .1 | | |
| Trans-3-penetnitrile, g | 30.9 | 28.0 | 30.1 | 24.7 | 21.4 | 15.4 |
| Cis-2-methyl-2-butenenitrile, g | | 1.2 | .34 | 1.7 | | 1.6 |
| 2-methyl-3-butenenitrile, g | 27.6 | 21.3 | 22.3 | 18.0 | 17.3 | 9.9 |
| Trans-2-methyl-2-butenenitrile, g | .05 | .77 | .26 | 45 | Trace | .20 |

[1] Heated at 100° C. for 8 hrs., except as Note 2, with 0.027 mole of Ni[P(OEt)$_3$]$_4$.
[2] Flashed at 100° C. and immediately cooled.

When a flash reaction does not occur, a reaction period of several hours is desirable to achieve best conversions, the lower temperature, the longer the reaction period. When flash reactions occur, high conversions are obtained in less than 6 minutes. The flash reaction is favored by a high butadiene:HCN ratio and a temperature above 90° Table IV shows the effect of reaction time on catalyst efficiency under various conditions.

These two products are separated by gas chromatography and identified by NMR, I.R. and mass spectrometry.

EXAMPLE IV

A mixture of 35 g. of 2,3-dimethylbutadiene, 13 g. of hydrogen cyanide and 10 g. of Ni[P(OEt)$_3$]$_4$ is charged to a 400 ml., stainless steel pressure tube, heated for 8 hours at 100° C., cooled and vented. Product is recovered

TABLE IV

| | Run 1 | Run 2 | Run 3 | Run 4 | Run 5 | Run 6 | Run 7 |
|---|---|---|---|---|---|---|---|
| Conditions[1] | | | | | | | |
| Flash | No | Yes | No | No | Yes | Yes | Yes |
| Time, hrs., at 100° C | 8 | [2]0 | [2]0 | 8 | 8 | [2]0 | [3]0 |
| HCN, ml | 27 | 27 | 54 | 54 | 27 | 27 | 27 |
| Butadiene, g | 54 | 54 | 108 | 108 | 108 | 108 | 108 |
| Products: | | | | | | | |
| Cis-3-pentenenitrile, g | .4 | .8 | .1 | .6 | .4 | .4 | .3 |
| 4-pentenenitrile, g | .10 | .34 | | Trace | | | |
| Trans-3-pentenenitrile, g | 24.7 | 30.0 | 16.3 | 58.3 | 28.0 | 31.0 | 29.9 |
| Cis-2-methyl-2-butenenitrile, g | 1.7 | .34 | | .31 | 1.16 | | .10 |
| 2-methyl-3-butenenitrile, g | 18.0 | 22.3 | 12.9 | 46.0 | 21.3 | 27.3 | 26.0 |
| Trans-2-methyl-2-butenenitrile, g | .45 | .26 | | .60 | .80 | .10 | .10 |

[1] Ni[P(OEt)$_3$]$_4$ catalyst (0.027 mole), temp.=100° C.
[2] Cooled by air stream over 1.5 hours.
[3] Cooled by quenching in Dry Ice for 6 minutes.

as an orange liquid. Gas chromatographic analysis of the crude liquid shows that the sample contains 7% of a compound which is shown by mass spectrometry to have a mass of 109. This corresponds to a monohydrocyanated product from 2,3-dimethylbutadiene.

EXAMPLE V

A mixture of 9 g. of Ni[P(OEt)$_3$]$_4$, 50 ml. of benzene, 70 g. of 1-pentene and 27 g. of hydrogen cyanide is charged to a 400 ml., stainless steel pressure tube, heated at 100° C. for 8 hours, cooled and vented. Unreacted pentene and benzene are recovered from the orange liquid by distillation and 5 g. of liquid are distilled from the residue. Gas chromatographic analysis shows that the liquid contains 12% capronitrile and 0.4% 2-methylvaleronitrile. Identity of these products is established by comparison of gas chromatographic retention times with known samples.

EXAMPLE VI

A mixture of 10 g. of Ni[P(OEt)$_3$]$_4$, 10 ml. of benzene, 20 g. of 3-pentenenitrile, and 6.7 ml. of HCN is charged to a 400 ml., stainless steel pressure tube, heated at 100° C. for 8 hours, cooled and vented. Gas chromatographic analysis shows that the orange crude sample contains 0.3% adiponitrile, and a trace of 2-methylglutaronitrile.

EXAMPLE VII

A solution composed of 5.0 g. of Ni[P(OEt)$_3$]$_4$ and 20 g. of 3-pentenenitrile is heated to 120° C. under a nitrogen atmosphere. Hydrogen cyanide gas is swept over the mixture by flowing nitrogen carrier gas so that a total of 9 ml. of liquid is added over a period of 1.25 hours. During the HCN addition, the reaction mixture rapidly changes from light yellow to deep red. Gas chromatographic analysis of the crude liquid shows that 1.1% adiponitrile and 0.3% 2-methyl-glutaronitrile is present.

EXAMPLE VIII

A mixture of 27 g. of Ni[P(OC$_6$H$_5$)$_3$]$_4$ and 60 g. of 3-pentenenitrile is charged to a 200 ml. glass flask and the system is purged well with nitrogen. The mixture is heated to 120° C. At about 110° C., all of the white solid dissolves to give a red brown solution. Hydrogen cyanide gas is swept over the hot reaction mixture by N$_2$ carrier gas. A total of 25 ml. of liquid HCN is added over a period of 1.5 hours. During this time, a light grey-green solid forms. Gas chromatographic analysis of the light yellow liquid products shows that it contains 9.7% adiponitrile and 3.9% 2-methylglutaronitrile. The identity of these products is further established by their separation with gas chromatography and characterization by infrared spectroscopy.

EXAMPLE IX

A mixture of 5.0 g. of Ni[(OEt)$_3$]$_4$, 10 ml. of benzene, 10 ml. of 4-pentenenitrile and 3.4 ml. of liquid HCN is charged to a 20 ml. stainless steel pressure tube, heated at 100° C. for 8 hours, cooled and vented. Gas chromatographic analysis shows that the crude liquid contains 3% adiponitrile and .5% 2-methylglutaronitrile.

EXAMPLE X

Six grams of anhydrous nickel bromide is suspended in 50 ml. of benzene and 22.4 g. of P(OEt)$_3$ is added. A dark red solution forms although a quantity of the solid NiBr$_2$ remains undissolved. To the red solution is added 3.9 g. of diethylamine and 5 ml. of acetonitrile. Within 5 minutes, the color of the mixture fades to light yellow green.

The catalyst mixture described above is charged to a 400 ml. stainless steel pressure tube along with 83 ml. of liquid butadiene and 27 ml. of liquid HCN. The mixture is heated at 100° C. for 8 hours. Volatile products are stripped from the crude sample by distillation at 0.1 mm. pressure at a pot temperature of 100° C. Gas chromatographic analysis shows that the distillate contains 3.5 g. of 2-methyl-3-butenenitrile, 1.3 g. of cis-2-pentenenitrile and 7.0 g. of trans-3-pentenenitrile.

EXAMPLE XI

A solution of 4.5 g. of Ni[P(OC$_6$H$_5$)$_3$]$_4$ in 20 ml. of m-xylene is charged to a 100 ml. glass flask which has been well purged with nitrogen. The solution is heated to 120° C. Butadiene gas is bubbled through liquid hydrogen cyanide at 25° C. and this resulting mixture of gases is swept over the hot catalyst solution. Butadiene flow is adjusted so that a total of 15 ml. of liquid HCN is swept over the reaction mixture during a 2 hour period. Analysis of the liquid in the reaction flask shows that it contains 3 g. of 2-methyl-2-butenenitrile, 2 g. of 2-methyl-3-butenenitrile, 9 g. of 3-pentenenitrile, 1 g. of 4-pentenenitrile, 2 g. of 2-methylglutaronitrile and 0.5 g. of adiponitrile.

EXAMPLE XII

A solution of 4.5 g. of Ni[P(OC$_6$H$_5$)$_3$]$_4$ in 20 ml. of m-xylene is charged to a 100 ml. glass flask which has been well purged with nitrogen. The solution is heated to 120° C. Butadiene gas is bubbled through liquid hydrogen cyanide at 25° C. and the resulting mixture of gases is swept over the hot catalyst solution. Butadiene flow is adjusted so that a total of 15 ml. of liquid hydrogen cyanide is introduced into the flask over a 2 hour period. Butadiene flow is then stopped and an additional 10 ml. of liquid hydrogen cyanide is introduced into the flask using nitrogen as a carrier gas. At the end of this time, analysis shows that the flask contains 3 g. of 2-methyl-2-butenenitrile, 1 g. of 2-methyl-3-butenenitrile, 8 g. of 2-pentenenitrile, 0.7 g. of 4-pentenenitrile, 2.5 g. of 2-methylglutaronitrile, and 0.6 g. of adiponitrile.

EXAMPLE XIII

A mixture of 9.0 g. of Ni[P(OC$_2$H$_5$)$_3$]$_4$ and 20.0 g. of 2-methyl-3-butenenitrile is charged to a 100 ml. glass flask and the system is purged well with nitrogen. The mixture is heated to 100° C. and hydrogen cyanide gas is swept across the hot reaction mixture by N$_2$ carrier gas. A total of 12 ml. of HCN is added over a 1.5 hour period. During this time, a light grey-green solid forms. Gas chromatographic analysis shows that the crude liquid product contains 2-methylglutaronitrile.

EXAMPLE XIV

A mixture of 1.0 g. (1.38 moles) of Ni[POC$_2$H$_5$]$_4$ and 25 ml. of p-xylene is charged to a 250 ml. glass flask and the system is purged well with nitrogen. The mixture is heated to 125° C. and 2.5 mmole/minute of allene, 1.6 mmole/minute of hydrogen cyanide, and 5 ml./minute of nitrogen are swept across the liquid in the flask until 390 mmole of hydrogen cyanide has been passed. The reaction mixture is analyzed and contains 5.4 g. of a butenenitrile mixture (81 mmole, 21 percent on HCN passed). These butenenitriles are 85% allyl cyanide, 10% cis- and trans-crotononitrile (in approximately equal amounts), and 5% methacrylonitrile.

The nitriles formed by the present invention are useful as chemical intermediates. For instance, adipontrile is an intermediate used in the production of hexamethylene diamine which is used in the production of polyhexamethylene adipamide, a commercial polyamide, useful in forming fibers, films and molded articles, and, in turn, 3-pentenenitrile may be used to form adiponitrile. Other nitriles can be converted to the corresponding acids and amines which are conventional commercial products.

I claim:

1. A process comprising contacting an unsaturated organic compound having olefinic carbon-carbon unsaturation selected from the class consisting of olefins, cyano substituted olefins, phenyl substituted olefins, and chloro substituted olefins, which organic compound contains from 2 to 20 carbon atoms, with hydrogen cyanide in the presence of a compound of the structure $$Ni[P(OR)_3]_4$$

wherein R is selected from the class consisting of alkyl and aryl groups containing up to 18 carbon atoms, in a molar ratio of from about 1:2 to about 2000:1 of said organic compound to nickel, at a temperature of from −25° to 200° C. and recovering an organic cyano compound derived from said unsaturated organic compound by addition of hydrogen cyanide to the olefinic carbon-carbon unsaturation of said unsaturated organic compound.

2. The process of claim 1 wherein the unsaturated organic compound is an olefin.

3. The process of claim 1 wherein the unsaturated organic compound is a cyano substituted olefin.

4. The process of claim 1 wherein the molar ratio of nickel compound to unsaturated organic compound is from 1:10 to 1:2000, and an excess of unsaturated organic compound with respect to hydrogen cyanide is present.

5. The process of claim 2 wherein the olefin is butadiene and the principal compounds derived therefrom recovered are 3-pentenenitrile and 2-methyl-3-butenenitrile.

6. The process of claim 3 wherein the unsaturated cyano substituted olefin is selected from the class consisting of 3-pentenenitrile and 4-pentenenitrile and the principal compound derived therefrom recovered is adiponitrile.

7. The process of claim 3 wherein the cyano substituted olefin is 2-methyl-3-butenenitrile and the principal compound derived therefrom recovered is 2-methylglutaronitrile.

8. The process of claim 5 wherein R is aryl and the temperature used is form 0° C. to 150° C.

9. The process of claim 6 wherein hydrogen cyanide is swept across or bubbled through the reaction mixture.

10. The process of claim 9 wherein R is aryl and the temperture used is from 0° C. to 150° C.

11. The process of claim 8 wherein each R is phenyl.

12. The process of claim 10 wherein each R is phenyl.

References Cited

UNITED STATES PATENTS

| | | | |
|---|---|---|---|
| 2,540,736 | 2/1951 | Kalb et al. | 260—465.9 |
| 2,571,099 | 10/1951 | Arthur et al. | 260—465.8 XR |

CHARLES B. PARKER, Primary Examiner

S. T. LAWRENCE, Assistant Examiner

U.S. Cl. X.R.

260—464. 465, 465.3, 465.7, 465.9

PO-1050
(5/69)

UNITED STATES PATENT OFFICE
CERTIFICATE OF CORRECTION

Patent No. 3,496,215        Dated February 17, 1970

Inventor(s) William C. Drinkard and Richard V. Lindsey, Jr.

It is certified that error appears in the above-identified patent and that said Letters Patent are hereby corrected as shown below:

Column 1, line 32, "2,751,099" should be "2,571,099."

Column 3, line 17, formula should be "$Ni[P(OEt)_3]_4$"

Column 3, line 56, after "lower" insert "the", line 60, after "90°" insert "C."

Table IV, Run 4, third line from the bottom, ".31" should be "3.1".

Column 5, Example IX, first line, formula should be "$Ni[P(OEt)_3]_4$".

Column 6, Example XIII, line 1, formula should be "$Ni[P(OC_6H_5)_3]_4$".

Column 6, Example XIV, line 1, formula should be "$Ni[P(OC_2H_5)_3]_4$".

Column 8, line 8, "form" should be "from".

Column 8, line 12, "temperture" should be "temperature".

SIGNED AND
SEALED
SEP 15 1970

(SEAL)
Attest:

Edward M. Fletcher, Jr.
Attesting Officer

WILLIAM E. SCHUYLER, JR.
Commissioner of Patents